US009434288B2

(12) United States Patent
Bohlke et al.

(10) Patent No.: US 9,434,288 B2
(45) Date of Patent: Sep. 6, 2016

(54) RECEIVING DEVICE FOR AT LEAST ONE CONTAINER IN A VEHICLE INTERIOR

(71) Applicants: Hartmut Bohlke, Wuppertal (DE); Juergen Salewski, Duesseldorf (DE); Wolfgang Sitzler, Wuppertal (DE); Wolfram Zummack, Troisdorf (DE); Andreas Goebbels, Kuerten (DE)

(72) Inventors: Hartmut Bohlke, Wuppertal (DE); Juergen Salewski, Duesseldorf (DE); Wolfgang Sitzler, Wuppertal (DE); Wolfram Zummack, Troisdorf (DE); Andreas Goebbels, Kuerten (DE)

(73) Assignee: BOS GMBH & CO. KG, Ostfildern (DE)

( * ) Notice: Subject to any disclaimer, the term of this patent is extended or adjusted under 35 U.S.C. 154(b) by 113 days.

(21) Appl. No.: 14/316,974

(22) Filed: Jun. 27, 2014

(65) Prior Publication Data

US 2015/0001363 A1 Jan. 1, 2015

(30) Foreign Application Priority Data

Jun. 28, 2013 (DE) ........................ 10 2013 212 551

(51) Int. Cl.
*B60N 3/10* (2006.01)
*B60R 7/04* (2006.01)

(52) U.S. Cl.
CPC ............... *B60N 3/106* (2013.01); *B60N 3/102* (2013.01)

(58) Field of Classification Search
CPC ........ B60N 3/106; B60N 3/102; B60N 3/10; B60N 5/006
USPC .................. 248/311.2, 313, 316.4; 224/926; 297/188.01
See application file for complete search history.

(56) References Cited

U.S. PATENT DOCUMENTS 5,171,061 A * 12/1992 Marcusen ............ B60N 2/4686 248/311.2
7,510,158 B1 * 3/2009 Terry ..................... B60N 3/106 220/529
2015/0001363 A1 * 1/2015 Bohlke .................. B60N 3/106 248/311.2

FOREIGN PATENT DOCUMENTS

DE 10 2012 221 398 A1 5/2013
JP 2012-6477 A 1/2012

OTHER PUBLICATIONS

German Examination Report issued in Appln. No. 10 2013 212 551.8 dated Feb. 3, 2014 (7 pages).

* cited by examiner

*Primary Examiner* — Tan Le
(74) *Attorney, Agent, or Firm* — Flynn, Thiel, Boutell & Tanis, P.C.

(57) ABSTRACT

Receiving device for at least one container in a vehicle interior. A receiving device comprising a receiving frame is known, at least one adjustable cup holder being arranged in said receiving device, said cup holder being able to be displaced along opposing guide tracks of the receiving frame, to which latching means are assigned in order to fix the cup holder in a releasable manner in different positions relative to the opposing guide tracks. Longitudinal synchronization means are assigned to the at least one cup holder in order to achieve a parallel displacement of the cup holder along the opposing guide tracks. Use in the vehicle interior of passenger motor vehicles.

17 Claims, 2 Drawing Sheets

1 2 3 4 4 5 5 6

1
2
3
4
5
6
7
8
9
10
11
12
13
14

9
7
12
9
15
12
17
11
10
17
5
19
11
18
16
20
5a
5
8
7
8
13
14

2
6
4
3

RECEIVING DEVICE FOR AT LEAST ONE CONTAINER IN A VEHICLE INTERIOR

CROSS REFERENCE TO RELATED APPLICATION

This claims priority from German patent application DE 102013212551.8, the disclosure of which is hereby incorporated into this application.

FIELD OF THE INVENTION

The invention relates to a receiving device for at least one container in a vehicle interior comprising a receiving frame in which at least one adjustable cup holder is arranged, said cup holder being able to be displaced along opposing guide tracks of the receiving frame, to which latching means are assigned in order to fix the cup holder in a releasable manner in different positions relative to the opposing guide tracks.

BACKGROUND OF THE INVENTION

Such a receiving device is disclosed in DE 10 2012 221 398 A1. The known receiving device has a receiving frame as well as two adjustable cup holders, wherein each cup holder is longitudinally displaceable on opposing guide tracks of the receiving frame. Manually releasable latching profiles are assigned to the cup holders, said latching profiles engaging in complementary latching profiles on the guide tracks and thus preventing undesired displacement of the cup holders along the receiving frame. By adjusting the cup holders, an adjustment of the receiving width may be achieved for the respective container to be received in the receiving frame.

SUMMARY OF THE INVENTION

It is the object of the invention to provide a receiving device of the type mentioned in the introduction which permits improved adjustability of the at least one cup holder.

This object is achieved by longitudinal synchronization means being assigned to the at least one cup holder in order to achieve a parallel displacement of the cup holder along the opposing guide tracks. By means of the solution according to the invention an inadvertent oblique positioning of the cup holder relative to the opposing guide tracks is avoided during a longitudinal adjustment along the guide tracks. By means of the solution according to the invention, the cup holder may be longitudinally displaced and fixed in a particularly accurate manner, therefore, and at right angles to the guide tracks. The term “cup holder” is not to be understood as limiting in the sense that the holder is only provided for cups. Rather, the cup holder is provided for securing containers or receptacles of any type, in particular bottles, cans and cups.

In an embodiment of the invention, the longitudinal synchronization means comprise a mechanical gearwheel synchronization means. This is a simple and functionally reliable embodiment.

In a further embodiment of the invention, the gearwheel synchronization means in the region of each of the two opposing guide tracks in each case comprises a toothed strip with which one respective pinion meshes, wherein the pinions are arranged fixedly in terms of rotation on opposing front faces of a common shaft which is rotatably mounted in the cup holder. The shaft extends at right angles transversely to the guide tracks and on its opposing front ends bears the two pinions which mesh with the two toothed strips of the opposing guide tracks. The toothed strips are arranged in each case in a stationary manner relative to the guide tracks. Preferably, the toothed strips and the guide tracks are incorporated integrally in the receiving frame. The receiving frame forms together with the at least one cup holder the lateral framing and support for a corresponding container. The receiving frame may also be additionally provided with a base in order to support the corresponding container not only at the side but also at the bottom. Preferably, such a receiving frame is designed as a receiving trough.

In a further embodiment of the invention, the actuating device comprises an operating button which may be moved in a reciprocating manner and which has means for the simultaneous transmission of movement to the latching means of both opposing guide tracks. As a result, it is possible to apply manual pressure to the operating button at any point and, irrespective of the loading point, always to achieve a simultaneous transmission of movement to the opposing latching means so that a simultaneous release of the latching means may be achieved on both sides of the cup holder.

In a further embodiment of the invention, the means for the simultaneous transmission of movement comprise a transmission rocker coupled to the operating button and mounted on the cup holder transversely to the guide tracks. The transmission rocker ensures a uniform reciprocal movement of the operating button irrespective of the point at which a manual pressure is exerted on the operating button. In the vertical direction of the receiving device, the operating button is able to be lowered by manual pressure and is able to be lifted by spring force.

In a further embodiment of the invention, the operating button extends in one piece over a width of the cup holder and is provided on its opposing sides with the latching means which serve for fixing the cup holder relative to the guide tracks. Preferably, the latching means are formed on the cup holder by latching teeth integrally formed on the operating button, said latching teeth engaging between corresponding teeth of the respective toothed strip in the region of the guide tracks which serve for the gearwheel synchronization. The toothed strips for the gearwheel synchronization thus additionally have the function of latching profiles on the sides of the receiving frame complementary to the latching teeth and together form the latching means with the latching teeth.

In a further embodiment of the invention, spring means are provided, said spring means holding the operating button in the unloaded resting position in a fixed position of the latching means. Preferably, helical compression springs are provided as spring means which are supported between the cup holder and operating button.

BRIEF DESCRIPTION OF THE DRAWINGS

Further advantages and features of the invention are revealed from the following description of a preferred exemplary embodiment of the invention which is shown with reference to the drawings.

DETAILED DESCRIPTION

Figures 1, 2, 3:
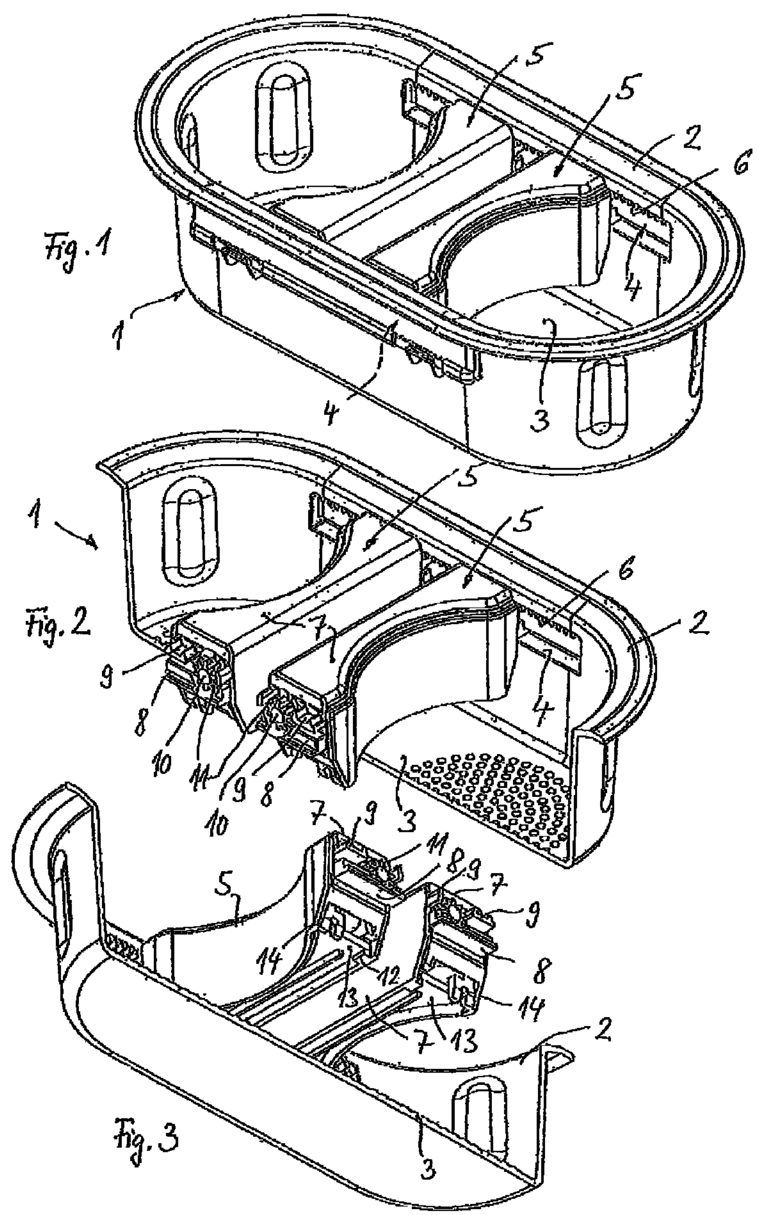
FIG. 1 shows an embodiment of a receiving device according to the invention in an isometric view.
FIG. 2 shows the receiving device according to FIG. 1 in a partially cut-away view.
FIG. 3 shows the receiving device according to FIG. 2 in a perspective view obliquely from below.

A receiving device 1 according to FIGS. 1 to 4 serves for receiving two containers. The receiving device 1 is provided for mounting in a vehicle interior in the region of a central armrest of a rear seat bench or in the region of a central console, in each case of a passenger motor vehicle. For mounting and integrating the receiving device 1, a recess or depression is provided both in the central armrest and in the central console, the receiving device 1 being inserted into said recess or depression and fixed to the vehicle. The receiving device 1 has a receiving frame 2 which consists of plastics material and is shaped with a base 3 to form a receiving trough. The base 3 is integrally formed with the receiving frame 2 to form the receiving trough. The receiving trough in plan view has an oval-like bottom surface with a peripheral upper edge which serves as a cover when mounting and integrating the receiving device 1 in a corresponding depression or recess in the vehicle interior. The receiving frame 2 has two longitudinal walls parallel to one another on opposing sides in which one respective elongated guide track 4 is provided. The two guide tracks 4 are aligned parallel to one another and extend over the same length. Both guide tracks 4 are provided on the lower face with a sliding surface which is of planar design and serves for the linear displacement of two cup holders 5. To this end, the two movable cup holders 5 which are designed independently of one another have sliding shoes 8 integrally formed on opposing front faces, said sliding shoes being longitudinally displaceable on the sliding surfaces of the guide tracks 4. The two cup holders 5 extend transversely over the width of the receiving frame 2 and are guided in a longitudinally displaceable manner in the longitudinal direction of the receiving frame 2 by means of the sliding shoes 8 in the opposing guide tracks 4. The two cup holders 5 form in each case one-piece guide bodies or housings 5*a* which are provided with the integrally formed sliding shoes 8 on their opposing front faces. Both cup holders 5 are bulged in a concave manner on their lateral contours remote from one another in order to be adapted to containers which are correspondingly bulged in a cylindrical or cylinder-like manner and which are placed in the receiving frame 2 in the region of the corresponding cup holder 5.

In order to be able to adapt the cup holders 5 to the support of containers or receptacles of different sizes, the two cup holders 5 are able to be displaced along the guide tracks 4. In order to be able to fix the cup holders 5 in the functional position respectively set in the longitudinal direction, latching means are assigned to each cup holder 5, said latching means being formed, on the one hand, by latching teeth 9 in the region of the cup holders 5 and by one respective toothed strip 6 in the region of each guide track 4, on the other hand. Bach guide track 4 is provided on its upper face opposing the planar sliding surface with a toothed strip 6 extending over the entire length of the guide track 4, the teeth thereof protruding from an upper edge of the guide tracks 4, in each case downwards to the sliding surface.

In the fixed state of the cup holders 5, the latching teeth 9 engage in the toothed strips 6 on the opposing front faces of each cup holder 5, said latching teeth being integrally formed on one respective operating button 7, which is movable in a reciprocating manner, of each cup holder 5.

Figure 4:
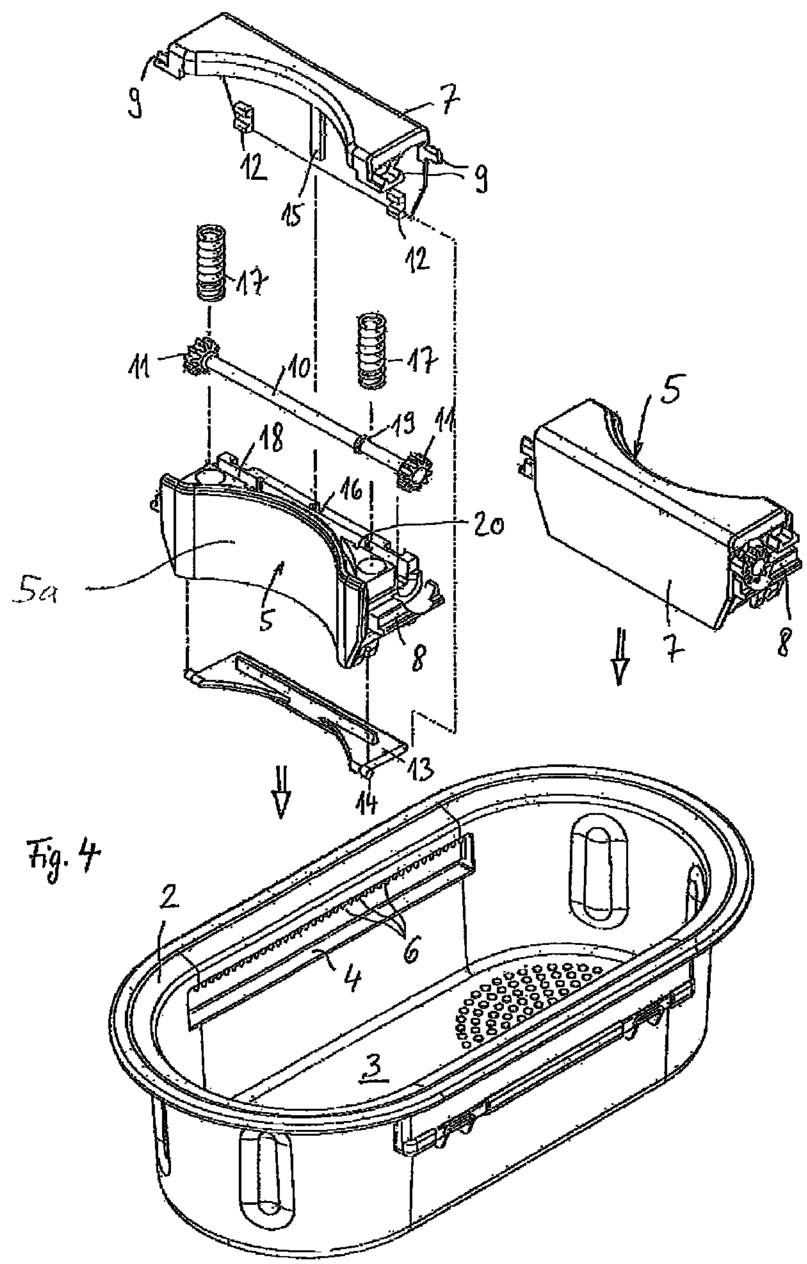
FIG. 4 shows an exploded view of the receiving device according to FIG. 1.

As may be seen with reference to FIG. 4, the operating button 7 of each cup holder 5 extends over the entire width of the cup holder 5 and is guided in a reciprocal manner by means of a linear guide 15, 16 in the guide body or housing 5*a* of the cup holder 5. Each operating button 7 is permanently held by means of two helical compression springs 17 in an upper end position, on the one hand, on an upper face of the guide body 5*a* of each cup holder 5 and on a lower face of the operating button 7, on the other hand, provided no manual pressure is exerted from above on the operating button 7. In the region of a lower face of the guide body 5*a*, i.e. opposite the operating button 7, a rocker 13 is pivotably movably mounted on each guide body 5*a* of each cup holder 5. The rocker 13 has on opposing sides one respective hinge pin 14 which is engaged in corresponding hinge receivers on the lower face of the guide body of the cup holder 5. The pivot axis thus formed extends in the transverse direction of the receiving frame 2 and thus transversely to the guide tracks 4. A front edge of the transmission rocker 13 remote from the hinge pin 14 is mounted in guide receivers 12 in the region of a lower face of the operating button 7 facing inwards, wherein a further hinge arrangement with a hinge axis is defined between the front edge and the guide receivers 12, said hinge axis extending parallel to the pivot axis defined by the hinge pin 14. The transmission rocker 13 thus contributes to the fact that an actuation of the operating button 7 by manual pressure is forcibly transmitted over the entire width of the operating button 7 between the opposing guide tracks 4, irrespective of the point at which the pressure is applied in the region of the upper face of the operating button 7, so that the operating button 7 is always pressed downwards with a parallel surface in the vertical direction of the receiving frame 2. The vertical linear guide 15, 16 also contributes thereto, and this has been described above. The linear guide 15, 16 in combination with the transmission rocker 13 thus forms the transverse synchronization unit for each cup holder, which achieves a parallel displacement of the operating button 7 downwards when pressure is applied from above.

Additionally a gearwheel shaft 10 is mounted in a rotatable movable manner in the guide body of each cup holder 5, said gearwheel shaft extending in the transverse direction of the receiving frame 2 and thus at right angles to the guide tracks 4. The gearwheel shaft 10 at its opposing front ends in each case bears a pinion 11 which are both connected fixedly in terms of rotation to the gearwheel shaft 10. The gearwheel shaft 10 is received in a rotary bearing receiver 18 of the guide body and is provided with axial securing elements 19, 20 in order to prevent axial displacement of the gearwheel shaft 10 along the width of the guide body. The two pinions 11 engage permanently in the opposing toothed strips 6 of the guide tracks 4 and together with the toothed strips form longitudinal synchronization means, in order to produce a parallel displacement of each cup holder 5 along the guide tracks 4. An inadvertent oblique positioning of the cup holder 5 during longitudinal displacement is reliably avoided as a result. Whilst the pinions 11 permanently engage in the toothed strips 6, the latching teeth 9 of the operating button 7 only engage in the toothed strips 6 from below when the operating button 7 is located in its unloaded resting position, forced upwards by the helical compression springs 17. In this resting position, the respective cup holder 5 is fixed relative to the guide tracks 4 in the longitudinal direction. In order to permit an adjustment of the respective cup holder 5 in the longitudinal direction of the receiving frame 2, the respective operating button 7 is manually pressed down, whereby at the same time the latching teeth 9 are released from the opposing toothed strips 6 on both opposing front faces of the operating button 7 and the cup holder 5 may be manually displaced. As soon as the desired position of the cup holder 5 has been reached in the longitudinal direction of the receiving frame 2, the manual pressure on the operating button 7 is removed whereby the helical compression springs 17 forcibly push the operating button 7 upwards again and the latching teeth 9 are forcibly engaged at a different point between the teeth of the opposing toothed strips 6. The cup holder 5 is thus fixed in this new functional position.

The invention claimed is:

1. A receiving device for at least one container located in a vehicle interior, said receiving device comprising:

a receiving frame, said receiving frame comprising first and second guide tracks disposed in opposed relation with one another;

at least one adjustable container holder disposed in said receiving frame and displaceable along said first and second guide tracks, said container holder including first and second latching teeth; and a mechanical gearwheel synchronization arrangement comprising first and second toothed strips respectively disposed adjacent said first and second guide tracks, a shaft including first and second pinions non-rotatably mounted on respective opposite ends of said shaft, said shaft being mounted on said container holder for rotation relative thereto, said first and second pinions being respectively disposed in meshing relationship with said first and second toothed strips to allow displacement of said container holder along said first and second guide tracks in a direction substantially parallel thereto, said first and second latching teeth of said container holder being respectively disposed to selectively engage said first and second toothed strips to fix said container holder in a releasable manner in a plurality of different positions relative to and along said first and second guide tracks.

2. The receiving device according to claim 1, wherein said container holder comprises a manual actuator configured to release said first and second latching teeth from the respective said first and second toothed strips and allow displacement of said container holder into one of said plurality of different positions relative to and along said first and second guide tracks.

3. The receiving device according to claim 2, wherein said first and second latching teeth are respectively disposed on opposite sides of said container holder, and said manual actuator comprises a mechanical synchronization unit for simultaneously releasing said first and second latching teeth from said first and second toothed strips.

4. The receiving device according to claim 3, wherein said manual actuator includes an operating button movable in a reciprocating manner, and said mechanical synchronization unit includes a transmission rocker element coupled to said operating button and mounted on said container holder so as to extend transversely to said first and second guide tracks.

5. The receiving device according to claim 4, wherein said operating button is a one-piece component extending over substantially an entire width of said container holder and said first and second latching teeth are disposed on opposite sides of said operating button.

6. The receiving device according to claim 5, further including a spring element disposed to bias said operating button in an unloaded resting position, and said first and second latching teeth are disposed in a fixed position relative to the respective said first and second toothed strips in the unloaded resting position of said operating button.

7. The receiving device according to claim 1, wherein said container holder includes an actuator mounted thereon for movement in a reciprocating manner between a first position in which said first and second latching teeth are fixedly engaged with the respective said first and second toothed strips and a second position in which said first and second latching teeth are disengaged from the respective said first and second toothed strips, and a spring disposed to bias said actuator in said first position.

8. The receiving device according to claim 7, wherein said first and second latching teeth are mounted on said actuator and said actuator is movable between said first and second positions in a direction transverse to said first and second guide tracks and said first and second toothed strips.

9. The receiving device according to claim 8, wherein said container holder extends transversely between said first and second guide tracks and said first and second toothed strips, said container holder including a housing and said actuator is mounted on said housing for reciprocal movement relative thereto between said first and second positions, said container holder further including a rocker element disposed adjacent a lower region of said housing in vertically spaced-apart relation from an upper surface of said actuator and being coupled to said actuator, said rocker element being pivotably connected to said housing and pivotably movable about a pivot axis oriented transversely to said first and second guide tracks and said first and second toothed strips.

10. The receiving device according to claim 9, wherein said actuator includes first and second guides spaced-apart from one another along a direction transverse to said first and second guide tracks, said first and second guides being configured to mount therein an edge of said rocker element disposed opposite and oriented substantially parallel to the pivot axis.

11. The receiving device according to claim 10, wherein said container holder includes a linear guide arrangement cooperating between said housing and said actuator to guide said actuator between said first and second positions, and said rocker element and said linear guide arrangement act to transmit a force, applied to said upper surface of said actuator to move same from said first position towards said second position, over an entire width of said actuator irrespective of a point at which the force is applied to said upper surface.

12. A receiving device for storing at least one container in a vehicle interior, said receiving device comprising:

a receiving frame, said receiving frame comprising first and second guide tracks disposed in spaced-apart relation with one another on opposite sides of said receiving frame;

a container holder mounted on said receiving frame and displaceable along said first and second guide tracks, said container holder including first and second latching teeth respectively disposed on opposite sides of said container holder;

first and second toothed elements mounted on said receiving frame adjacent the respective said first and second guide tracks; and a shaft including first and second pinions non-rotatably mounted on respective opposite ends of said shaft, said shaft being mounted on said container holder for rotation relative thereto, said first and second pinions being respectively disposed in meshing engagement with said first and second toothed elements to allow displacement of said container holder along said first and second guide tracks in a direction substantially parallel thereto, and said first and second latching teeth of said container holder being respectively disposed to selectively engage said first and second toothed elements to fix said container holder in one of a plurality of different positions relative to and along said first and second guide tracks.

13. The receiving device according to claim 12, wherein said container holder includes an actuator mounted on said container holder for movement in a reciprocating manner between a first position in which said first and second latching teeth are fixedly engaged with the respective said first and second toothed elements and a second position in which said first and second latching teeth are disengaged from the respective said first and second toothed elements, and a spring disposed to bias said actuator in said first position.

14. The receiving device according to claim 13, wherein said first and second latching teeth are mounted on opposite sides of said actuator and said actuator is movable between said first and second positions in a direction transverse to said first and second guide tracks and said first and second toothed elements.

15. The receiving device according to claim 14, wherein said container holder extends transversely between said first and second guide tracks and said first and second toothed elements, said container holder including a housing and said actuator is mounted on said housing for reciprocal movement relative thereto between said first and second positions, said container holder further including a rocker element disposed adjacent a lower region of said housing in vertically spaced-apart relation from an upper surface of said actuator and being coupled to said actuator, said rocker element being pivotably connected to said housing and pivotably movable about a pivot axis oriented transversely to said first and second guide tracks.

16. The receiving device according to claim 15, wherein said actuator includes first and second guides spaced-apart from one another in a direction transverse to said first and second guide tracks, said first and second guides being configured to mount therein an edge of said rocker element disposed opposite and oriented substantially parallel to the pivot axis.

17. The receiving device according to claim 16, wherein said container holder includes a linear guide arrangement cooperating between said housing and said actuator to guide said actuator between said first and second positions, and said rocker element and said linear guide arrangement act to transmit a force, applied to said upper surface of said actuator to move same from said first position towards said second position, over an entire width of said actuator irrespective of a point at which the force is applied to said upper surface.

* * * * *